2,714,586

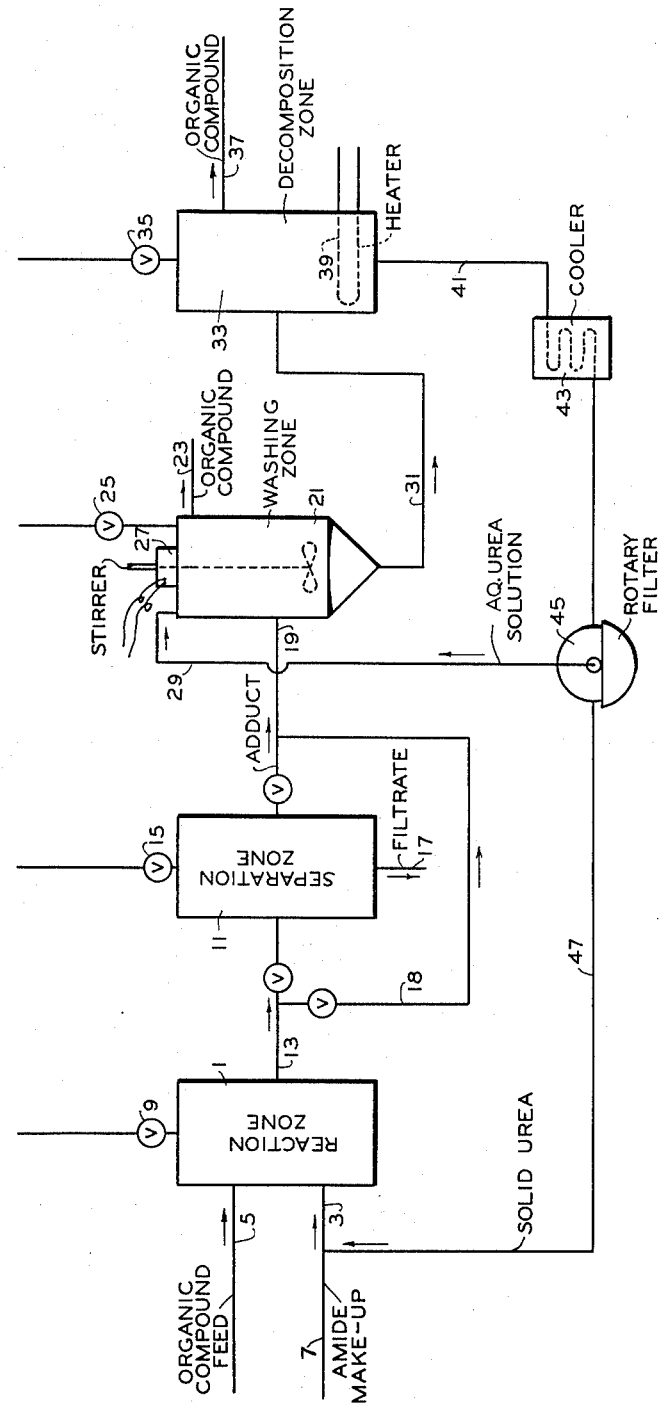

WASHING UREA AND THIOUREA CONTAINING ADDUCTS

Charles S. Lynch, Bartlesville, Okla., assignor to Phillips Petroleum Company, a corporation of Delaware Application June 25, 1951, Serial No. 233,403

10 Claims. (Cl. 260—96.5)

This invention relates to a method for separating an organic compound of one type and capable of forming an adduct with urea or thiourea from a substantially water insoluble organic compound of another type or a group of organic compounds of one type and capable of forming adducts with urea or thiourea from a group of substantially water insoluble organic compounds of another type. In another aspect it relates to a method for washing such adducts for their purification. In another aspect this invention relates to a method for separating such organic compounds by forming adducts with urea or with thiourea wherein a certain degree of purification or separation is effected and further purifying the separated material by washing the adducts with a saturated, aqueous solution of the adduct-forming agent. In still another aspect it relates to such a method of purification wherein the urea or thiourea adduct-forming organic compounds are adduct-forming hydrocarbons.

There are many known processes for the separation of organic compounds from admixture with one or more other organic compounds. Thus, a compound having a boiling point differing substantially from another compound can be separated by means of fractional distillation. However, compounds having similar boiling points are difficultly separated by such a process. For example, normal octane, boiling point 125.6° C. cannot be economically separated from 2,2,4-trimethylhexane, boiling point 125.5° C. by fractional distillation because of the very small difference in boiling points. Such a separation, however, is very often desirable as, for example, in a gasoline manufacturing process in order to improve the octane rating or antiknock value of the gasoline by removal of the low octane value straight chain hydrocarbons. In another type of separation advantage is taken of the degree of unsaturation of the compounds being separated. For example, normal octane can be separated from 3-methyl-2-heptene by polymerization of the 3-methyl-2-heptene to form a higher boiling point polymer or by its reaction with another material, as bromine or sulfuric acid to form an intermediate which is then easily separable from the n-octane. Still another method of separation of close boiling compounds involves the use of azeotropic forming agents or entrainers wherein one compound will form a lower boiling point azeotropic mixture with the entrainer than will the other compounds in the presence of the entrainer whereby the lower boiling azeotrope is distilled overhead in a fractionation column.

There has recently been discovered a process for the separation of organic compounds, which process permits the separation of a class of compounds having one type of molecular arrangement from a class of compounds having a different molecular arrangement. Thus, straight chain hydrocarbons can be separated individually or as a class from branched chain and/or cyclic hydrocarbons independently of the boiling points of the compounds being separated. This process depends upon the peculiar property of urea which permits it to form adducts with organic compounds having straight carbon atom chains and yet not to form adducts with branched chain or cyclic organic compounds. In such a process it is possible to separate, for example, n-octane from 2,2,4-trimethylhexane, isooctane or other branched chain hydrocarbons irrespective of their boiling points. Also, straight chain hydrocarbons can readily be separated from cyclic hydrocarbons such as benzene, toluene or the cycloparaffins irrespective of the boiling points of the various components of the mixture. The adducts thus formed are readily recoverable by filtration or other suitable means from the organic compounds that form no adducts with urea and then the adducts are dissociated or decomposed into their original compounds to recover the urea and the adduct-forming organic compound. The decomposition operation may be carried out by any suitable means wherein sufficient temperature is maintained to dissociate the adduct into the urea and the organic compound without substantial decomposition of either. Another method for decomposing the adducts is to treat the adduct with a sufficient quantity of warm or hot water by which operation the urea is dissolved in the water and accordingly the adduct is decomposed with the liberation of the organic constituents therefrom.

While urea forms adducts with organic compounds having straight carbon atom chains, thiourea forms adducts with organic compounds having branched or cyclic carbon atom chains. Thus, the adduct forming property of thiourea permits a ready method of separation of such organic compounds from organic compounds having straight carbon atom chains since the latter do not form adducts with thiourea. The thiourea aducts may be decomposed into the original compounds by the same general means as applied to the decomposition or dissociation of the urea adducts.

Adducts of organic compounds with either urea or thiourea to which my invention applies are disclosed by Bengen, German patent application, O. Z. 12,438 (1940), Technical Oil Mission, Reel 6, page 263, and by Fetterly, 2,499,820.

One object of my invention is to provide a process for separating a urea or thiourea adduct-forming organic compound from a substantially water-in-soluble organic compound.

Another object of my invention is to provide a process for separating a hydrocarbon of one of the aforementioned types from other hydrocarbons of the aforementioned types and the recovery of at least one of the hydrocarbons in a relatively pure form.

Another object of my invention is to devise a process for the separation of hydrocarbons of different types wherein one of the hydrocarbons may be recovered as a product free from contamination with the other hydrocarbon.

Still another object of my invention is to devise a process for purifying an adduct from contaminating hydrocarbon material.

Still other objects and advantages of my process will be realized upon reading the following disclosure which taken with the accompanying drawing forms a part of this specification.

In accordance with my invention I have found that adducts or addition products of an amide selected from the group consisting of urea and thiourea and organic compounds reactive with said amide to form adducts can be purified from occluded hydrocarbons by washing the adduct with a saturated aqueous solution of the amide.

The organic compounds that form adducts with urea are many and varied, and because of such reactivity any straight-chain organic compound capable of forming a solid adduct with urea can be separated from its admixture with any branched-chain or cyclic organic compound that does not form a solid adduct with urea. In determining whether any particular organic compound will or will not form an adduct with urea, it is necessary merely to admix such compound and urea, activated with a solvent as discussed hereinafter, with agitation and then determine whether any crystalline product or adduct has formed. Obviously, such a determination is a matter of mere routine test, and it is well within the skill of the art. However, it has been found that a straight-chain organic compound having a straight aliphatic carbon atom chain containing from six to fifty carbon atoms therein will form adducts with urea in preference to branched-chain or cyclic organic compounds. The straight-chain organic compounds can be unsubstituted hydrocarbons as well as hydrocarbons containing substituents groups, which will be discussed hereinbelow, attached to one of the two end carbon atoms of the carbon chain. Thus, one or more of such straight-chain hydrocarbons as the paraffinic hydrocarbons containing from six to fifty carbon atoms, for example, hexane, heptane, octane, nonane, decane, undecane, dodecane, tridecane, tetradecane, and progressively higher molecular weight straight-chain paraffins up to and including pentacontane; and the straight-chain olefins containing from six to fifty carbon atoms, for example the hexenes, heptenes, octenes, nonenes, decenes, undecenes, dodecenes, tridecenes, tetradecenes, and progressively higher molecular weight straight-chain olefins up to and including the pentacontenes, form adducts with urea, and accordingly, they can be readily separated from branched-chain or cyclic hydrocarbons that do not form adducts with urea. Similarly, the corresponding diolefinic hydrocarbons of the above-named compounds form adducts with urea provided the hydrocarbons contain an unbranched chain of from six to fifty carbon atoms. Additionally, many derivatives of these saturated and unsaturated hydrocarbons form adducts with urea. For example, hydroxy, amino, mercaptan, and halide derivatives of these hydrocarbons form adducts with urea. Also, various ketone and ester derivatives of these hydrocarbons react similarly. Ordinarily, the various substituent groups set forth above are attached to one of the two end carbon atoms in the unbranched carbon chain of six to fifty carbon atoms. However, when fluoride atoms are attached to the carbon chain, they act similar to hydrogen atoms, and, when attached to other carbon atoms in the unbranched chain, they do not inhibit the formation of adducts with urea. The primary characteristic of these organic compounds is the unbranched chain of from six to fifty carbon atoms.

On the other hand, organic compounds containing a branched chain of carbon atoms form adducts with thiourea, and in accordance with this property they are readily separable from organic compounds containing a straight chain of carbon atoms. Thus, with thiourea branched chain hydrocarbons containing from three to fifty carbon atoms in the straight carbon atom chain portion of the molecule and also having one or more alkyl substituents therein ranging from one to twenty carbon atoms in length, for example, methyl propane, the methyl butanes, dimetyl butane, the methyl pentanes, the ethyl pentanes, trimethyl pentane, diethyl pentane, the methyl hexanes, di-, tri-, and tetramethyl hexane, the ethyl hexanes, di-, tri-, and tetraethyl hexane, propyl heptane, and other alkyl paraffins as well as methyl propene, the methyl butenes, di-, tri-, and tetramethyl butenes, the methyl pentenes, the ethyl pentenes, trimethyl pentenes, diethyl pentene and other branched-chain olefins including higher molecular weight olefins, for example, methyl, ethyl, propyl and butyl derivatives of hexadecene, docosene and pentacontene, will form adducts with thiourea. Also, the corresponding branched chain diolefinic hydrocarbons react similarly. Furthermore, these branched chain compounds may have attached either to the straight chain or the branched chain of carbon atoms any one of the substituent groups set forth above in the discussion of compounds that form adducts with urea. The primary characteristic of these compounds is the branched chain of carbon atoms.

Various alicyclic-type organic compounds form adducts with thiourea. For example, cycloparaffins, such as cyclopentane, cyclohexane, methylcyclopentane, methylcyclohexane, di- and trimethylcyclopentane, and the like, and the corresponding unsaturated hydrocarbons form adducts with thiourea. Also, menthane has been found to form such adducts with thiourea, as well as oxygenated derivatives of terpenes, such as camphor, borneol, fenchone, and the like. It is within the scope of my invention to separate mixtures of organic compounds containing any of the compounds described above, and it is also within the scope of my invention to purify adducts of the above-described organic compounds and either urea or thiourea.

The urea adducts that are washed for purification purposes with an aqueous solution of the proper amide in accordance with my invention contain more than three moles of urea per mole of organic compound, and the thiourea adducts contain more than two moles of thiourea per mole of organic compounds.

In forming the adducts the organic compounds discussed above are contacted with either urea or thiourea at a temperature between that of the normal atmosphere, say 60 to 80° F., and about 347° F. From two to 100 moles of amide per mole of organic compound are employed and agitation of the reaction mixture hastens the adduct-forming reaction. The amide is introduced into the reaction zone in the solid state and preferably it is wetted with from about 3 to 10 weight per cent water, based on the weight of the amide. Various methods of contacting the amide and the organic compounds can be employed. For example, the moistened amide and the organic compound can be agitated in a batch mixing zone or they may be contacted either concurrently or countercurrently. Additionally, either a fluidized fixed bed or a moving bed, may be employed, and the organic compounds are passed into contact therewith.

The temperature at which the adducts are decomposed in the final recovery zone is dependent upon the organic compound in the adduct, since the thermal stability of the adducts is dependent upon the number of carbon atoms in or upon the molecular weight of the organic compound. For example, in a saturated solution of urea in water, an adduct of n-heptene and urea decomposes at about 98° F.; an adduct of n-decane and urea decomposes at about 147° F.; and an adduct of n-hexadecane and urea decomposes at about 197° F. In general, the decomposition temperature is above the temperature at which the adduct is formed. I prefer to use a temperature within the range of about 80° to 270° F. and, of course, the actual temperature employed is dependent upon the adduct being decomposed. Temperatures higher than about 270° F. can be used if desired but such temperatures cause decomposition of at least a portion of the amide and for that reason it is preferred to avoid such high temperature whenever possible.

One particular advantage of my process over the art is that by my use of an aqueous wash solution, separation of the removed occluded material from this wash solution is simpler since the organic material may ordinarily be removed therefrom by decantation because of their usual mutual insolubility. This operation may be contrasted with a prior art process in which an extraneous organic wash liquid is used in which case this latter liquid has to be separated from the removed occluded material by such an operation as, for example, distillation, solvent extraction or the like.

In the operation of a unitary process in which the washing operation of my invention is included a hydrocarbon mixture to be separated into component hydrocarbons is introduced into a reaction zone 1 through a line 5. Solid urea moistened with water as hereinbefore mentioned is introduced into this zone through a line 3. In this reaction zone 1 the hydrocarbon or organic compound feed and urea are mixed for intimate contacting by any desired means, as by a mechanical mixer or by countercurrent or concurrent contacting. The product mixture is passed through a conduit 13 into a filter zone 11. This filter zone may be, if desired, a continuous rotary filter apparatus, or may be a batch-type filter or may even be a zone in which unreacted hydrocarbon is separated from solid adduct by decantation. By whatever method this separation is accomplished a liquid filtrate or a decanted material is removed through a line 17. This material will consist of the unreacted organic compound. Solid adduct separated from filtrate or supernatant liquid in the separation zone 11 is passed through a line 19 into a washing zone 21. In this washing zone 21 the solid adduct material is slowly agitated by a stirrer 27 with a saturated aqueous solution of the same amide material which was used in forming the adduct. By this slow stirring operation this saturated aqueous amide solution replaces the occluded organic compound held by the adduct material. This liberated organic compound material, ordinarily specifically lighter than the saturated wash solution, floats to the top thereof and may be removed through a line 23 for such disposal as desired. This material from line 23 is in general the same material as is in the filtrate or decantation product removed through line 17 and may be combined therewith for disposal or such use as desired.

The washed adduct material with the aqueous washing liquid is removed from the washing zone through a line 31 and is introduced into a decomposition zone 33. In this decomposition zone is a heating means such as a coil 39 by means of which heat may be added to the adduct for its dissociation or decomposition into its component parts. In case urea was the amide used in forming the adduct, then in this decomposition zone 33 urea and the organic material will be separated, the organic material ordinarily rising to the surface of the aqueous urea. The organic material may then be removed through a line 37 and disposed of as desired. This is one of the main products of the process. As a source of heat for circulation through the coil 39 steam or hot water or other heat transfer material as desired may be used. The resulting aqueous urea solution from the decomposition zone 33 is removed therefrom through a line 41 and it is passed through a cooler 43. In this cooler 43 sufficient cooling is imparted to the urea solution that at least a portion of the urea content precipitates as solid crystalline urea. This cooled material comprising urea crystals in a saturated aqueous urea solution is transferred on from the cooler 43 to a filter, such as a rotary filter 45 for separation of the solid urea from the aqueous urea solution. The separated aqueous urea solution is then transferred on through conduit 29 for addition into the washing zone 21 for washing further quantities of adduct. The separated solid urea is transferred from the filter 45 through a conduit 47 for reintroduction into the original reaction zone 1 by way of conduit 3. Make up solid urea as required is introduced into the system through the line 7 from a source not shown. Zones 1, 11, 21, and 33 are provided with lines containing pressure relief valves 9, 15, 25, and 35, respectively in case relief of pressure from these vessels is necessary.

A by-pass line 18 is provided for conducting the reaction mixture from the reaction zone 1 directly to the washing zone 21 without passing through the filter or separation zone 11. In this case, when the separation zone 11 is by-passed this reaction material from reaction zone 1 is passed through the line 13, line 18, and line 19 directly into the washing zone. In this zone the saturated aqueous amide solution is introduced as heretofore disclosed through the line 29 and the occluded hydrocarbon material is displaced from the solid adduct by the aqueous solution. The organic material floating upon the aqueous amide solution in the washing zone 21 in this embodiment will consist of the displaced occluded organic material and also the organic material which would have been removed in separation zone 11 had this separation zone been used. The unreacted and the displaced organic material is then removed from the washing zone 21 through the line 23 for such disposal as desired.

The stirring apparatus 27 in the washing zone 21 may be any type of stirring apparatus desired providing it be operated in such a manner as to stir slowly the material in this washing zone. If this stirring apparatus were to be operated at a high rate of speed the solid adduct material and unreacted solid amide material might be maintained in such a state of agitation that some of these solid materials might be withdrawn through the organic material draw-off line 23 and, of course, such operation is not desirable. Further, if agitation is too severe proper separation of the specifically light organic material and the specifically heavy aqueous solution in the washing zone is not complete and some of this organic material might pass out through the adduct draw-off line 31. Any hydrocarbon material passing through conduit 31 into the decomposition zone 33 will be recovered through conduit 37 as a portion of the product of the process. Thus, any organic material not properly separated in the washing zone 21 will be recovered through the line 37 as an impurity in the desired product of the process.

As an example of the operation of my process a mixture of 200 parts by volume of cetane and 1135 parts by volume of isooctane was contacted with 500 parts by weight of urea at 75° F. using 35 parts by weight of water as an activator. Contacting was effected with slow stirring over a period of one hour. At the end of this time the solid adduct was removed from the unreacted liquid by decantation and filtration. The filtrate after drying was substantially pure isooctane as shown by its index of refraction, $n_d^{20}$=1.3923.

The filter cake was divided into two portions. The first portion was decomposed by dissolving the urea content from the adduct with water with the resultant liberation of hydrocarbon. This liberated hydrocarbon, after drying, had an index of refraction of $n_d^{20}$ of 1.4130, indicating that the hydrocarbon consisted of 49 liquid volume per cent cetane. The second portion of filter cake, 258 parts by weight, was agitated for 15 minutes with 1000 parts by volume of saturated aqueous urea (75° F.). At the end of this agitation period the supernatant material was removed from the solid adduct material by decantation. The residual adduct-urea solution slurry was then filtered. Upon decomposing the adduct filter cake with water the liberated hydrocarbon had an index of refraction, ($n_d^{20}$) of 1.4255, which corresponded to a cetane content of 78 liquid volume per cent. The cetane and isooctane stocks used in making this run had indices of refraction ($n_d^{20}$) of 1.4350 and 1.3922, respectively.

Such auxiliary apparatus as valves, pumps, pressure and temperature indicating and recording apparatus are not shown in the drawing nor mentioned in relation to the operation of the process for purposes of simplicity. It is obvious to those skilled in the art that such apparatus is necessary for the operation of such a system. The installation and operation of such apparatus is well understood by those skilled in the art.

While the invention has been described in connection with the present preferred embodiments thereof it is understood that the hereinbefore descriptions are illustrative only and are not intended to limit the invention, the scope of which is defined by the appended claims.

I claim:

1. A process for purifying an adduct of an occluded hydrocarbon impurity, said adduct being selected from the group of adducts consisting of a urea adduct of a normal paraffinic hydrocarbon selected from the group of n-paraffinic hydrocarbons having from 6 to 50 carbon atoms per molecule, comprising, admixing said adduct at a temperature below the adduct decomposition temperature with a saturated aqueous solution of urea, settling the adduct from said hydrocarbon impurity of the admixture and recovering the settled adduct and the impurity from the settled admixture as separate products of the process.

2. A process for purifying an adduct of an occluded hydrocarbon impurity, said adduct being selected from the group of adducts consisting of a thiourea adduct of a branched chain hydrocarbon selected from the group of branched chain hydrocarbons having from 3 to 50 carbon atoms in the straight carbon chain portion of the hydrocarbon molecule, comprising, admixing said adduct at a temperature below the adduct decomposition temperature with a saturated aqueous solution of thiourea, settling the adduct from said hydrocarbon impurity of the admixture and recovering the settled adduct and the impurity from the settled admixture as separate products of the process.

3. A process for separating a branched carbon chain hydrocarbon having from 3 to 50 carbon atoms in the straight carbon chain portion of the molecule from a liquid mixture with other hydrocarbons comprising admixing said liquid mixture of hydrocarbons with solid thiourea moistened with water under conditions to form a branched carbon chain hydrocarbon-thiourea adduct, removing excess unreacted hydrocarbon from adduct containing occluded unreacted hydrocarbon of the process, washing said adduct containing said occluded unreacted hydrocarbon by adding with stirring a saturated aqueous solution of thiourea at a temperature below the adduct decomposition temperature whereby said occluded hydrocarbon is liberated from said adduct, separating the liberated hydrocarbon from a slurry comprising adduct and a saturated aqueous solution of thiourea, removing the separated liberated hydrocarbon as a second product of the process, heating the separated slurry to its adduct decomposition temperature and recovering an aqueous thiourea solution and said branched chain hydrocarbon as the main product of the process.

4. In the process of claim 3, cooling the recovered aqueous thiourea solution to precipitate thiourea, separating the precipitated thiourea from saturated aqueous thiourea solution, returning the separated thiourea to the original admixing operation as the solid thiourea moistened with water and returning the saturated aqueous thiourea solution to the washing operation as the aforesaid saturated aqueous solution of thiourea.

5. A process for separating a n-paraffin hydrocarbon having from 6 to 50 carbon atoms per molecule from a liquid mixture with other hydrocarbons comprising admixing said liquid mixture of hydrocarbons with solid urea moistened with water under conditions to form a n-paraffin-adduct, removing excess unreacted hydrocarbons from adduct containing occluded unreacted hydrocarbon as one product of the process, washing said adduct containing said occluded unreacted hydrocarbon by adding with stirring a saturated aqueous solution of urea at a temperature below the adduct decomposition temperature whereby said occluded hydrocarbon is liberated from said adduct, and from this washing operation recovering liberated hydrocarbon and n-paraffin hydrocarbon adduct as separate products of the process.

6. A process for separating a branched chain hydrocarbon having from 3 to 50 carbon atoms in the straight carbon chain portion of the molecule from a liquid mixture with other hydrocarbons comprising admixing said liquid mixture of hydrocarbons with solid thiourea moistened with water under conditions to form a branched carbon chain hydrocarbon-thiourea adduct, removing excess unreacted hydrocarbon from adduct containing occluded unreacted hydrocarbon as one product of the process, washing said adduct containing said occluded unreacted hydrocarbon by adding with stirring a saturated aqueous solution of thiourea at a temperature below the adduct decomposition temperature whereby said occluded hydrocarbon is liberated from said adduct, separating the liberated hydrocarbon from the branched carbon chain hydrocarbon-thiourea adduct and recovering the separated liberated hydrocarbon and adduct as separate products of the process.

7. A process for purifying an adduct of an occluded impurity, said adduct being selected from the group of adducts consisting of a urea-containing adduct containing more than three moles of urea per mole of urea adduct and a thiourea-containing adduct containing more than two moles of thiourea per mole of said thiourea-containing adduct, comprising, admixing said adduct at a temperature below the adduct decomposition temperature with a saturated aqueous solution of the amide of the adduct being purified, settling the adduct from said occluded impurity of the admixture and recovering from this settling operation said impurity and said adduct as separable products of the process.

8. A process for removing an occluded hydrocarbon impurity from an adduct containing said impurity, said adduct being selected from the group of adducts consisting of a urea-hydrocarbon adduct containing more than three moles of urea per mole of urea-hydrocarbon adduct and a thiourea hydrocarbon adduct containing more than two moles of thiourea per mole of thiourea-hydrocarbon adduct, comprising, admixing said adduct at a temperature below the adduct decomposition temperature with a saturated aqueous solution of the amide contained in the adduct being treated, settling the adduct from said occluded impurity of the admixture and recovering from this settling operation said hydrocarbon impurity and said adduct as separate products of the process.

9. A process for separating a n-paraffin hydrocarbon having 6 to 50 carbon atoms per molecule from a liquid mixture with other hydrocarbons comprising admixing said liquid mixture of hydrocarbons with solid urea moistened with water under conditions to form a n-paraffin-urea adduct, removing excess unreacted hydrocarbon from adduct containing occluded unreacted hydrocarbon as one product of the process, washing said adduct containing said occluded unreacted hydrocarbon by adding with stirring a saturated aqueous solution of urea at a temperature below the adduct decomposition temperature whereby said occluded hydrocarbon is liberated from said adduct, separating the liberated hydrocarbon from a slurry comprising adduct and saturated aqueous solution of urea, removing the separated liberated hydrocarbon as a second product of the process, heating the separated slurry to its adduct decomposition temperature, recovering an aqueous urea solution, and recovering n-paraffin hydrocarbon as the main product of the process.

10. In the process of claim 9 cooling the recovered aqueous urea solution to precipitate urea, separating the precipitated urea from saturated aqueous urea solution, returning the separated urea to the original admixing operation as the solid urea moistened with water and returning the saturated aqueous urea solution to the washing operation as the aforesaid saturated aqueous solution of urea.

References Cited in the file of this patent

UNITED STATES PATENTS

| | | |
|---|---|---|
| 2,300,134 | Priewe | Oct. 27, 1942 |
| 2,520,716 | Fetterly | Aug. 29, 1950 |
| 2,569,984 | Fetterly | Oct. 2, 1951 |
| 2,569,986 | Fetterly | Oct. 2, 1951 |
| 2,577,202 | Lien et al. | Dec. 4, 1951 |
| 2,627,513 | Arey, Jr. | Feb. 3, 1953 |

FOREIGN PATENTS

| | | |
|---|---|---|
| 959,374 | France | Sept. 26, 1949 |